United States Patent
Wang et al.

(10) Patent No.: US 11,997,374 B2
(45) Date of Patent: May 28, 2024

(54) CAMERA MODULE WITH LIQUID LENS AND IMAGE PLANE CORRECTION METHOD THEREOF

(71) Applicant: NINGBO SUNNY OPOTECH CO., LTD., Zhejiang (CN)

(72) Inventors: Mingzhu Wang, Zhejiang (CN); Lifeng Yao, Zhejiang (CN); Zhenyu Chen, Zhejiang (CN); Enlai Xiang, Zhejiang (CN); Qianyou Huang, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 379 days.

(21) Appl. No.: 17/312,582

(22) PCT Filed: Oct. 25, 2019

(86) PCT No.: PCT/CN2019/113349
§ 371 (c)(1),
(2) Date: Jun. 10, 2021

(87) PCT Pub. No.: WO2020/119283
PCT Pub. Date: Jun. 18, 2020

(65) Prior Publication Data
US 2021/0329151 A1    Oct. 21, 2021

(30) Foreign Application Priority Data
Dec. 13, 2018   (CN) .......................... 201811522097.7

(51) Int. Cl.
*H04N 23/55*    (2023.01)
*H04N 23/54*    (2023.01)
(Continued)

(52) U.S. Cl.
CPC ............. *H04N 23/55* (2023.01); *H04N 23/54* (2023.01); *H04N 23/60* (2023.01); *H04N 23/57* (2023.01)

(58) Field of Classification Search
CPC ........ H04N 23/50; H04N 23/54; H04N 23/55; H04N 23/57; G02B 13/0075; G02B 26/004
See application file for complete search history.

(56) References Cited

U.S. PATENT DOCUMENTS

| | | |
|---|---|---|
| 2005/0200973 A1 | 9/2005 | Kogo et al. |
| 2006/0164540 A1 | 7/2006 | Kayanuma |

(Continued)

FOREIGN PATENT DOCUMENTS

| | | |
|---|---|---|
| CN | 1818737 | 8/2006 |
| CN | 101056360 | 10/2007 |

(Continued)

OTHER PUBLICATIONS

Office Action dated Mar. 2, 2022, in corresponding Indian Patent Application No. 202117030949.

(Continued)

*Primary Examiner* — Daniel M Pasiewicz
(74) *Attorney, Agent, or Firm* — Wenderoth, Lind & Ponack, L.L.P.

(57) ABSTRACT

The present invention discloses a camera module with liquid lens and an image plane correction method thereof, wherein the camera module with liquid lens includes a photosensitive assembly, a lens assembly and a correction lens, and the lens assembly includes a liquid lens with adjustable focal power, the liquid lens is held in a photosensitive path of the photosensitive assembly, and the correction lens is held in the photosensitive path of the photosensitive assembly, and the correction lens is located between the liquid lens and the (Continued)

photosensitive assembly, the correction lens and the liquid lens of the lens assembly cooperate with each other to compensate for aberrations, so as to correct the aberration of the optical system of the camera module with liquid lens.

10 Claims, 9 Drawing Sheets

(51) Int. Cl.
*H04N 23/57* (2023.01)
*H04N 23/60* (2023.01)

(56) References Cited

U.S. PATENT DOCUMENTS

| | | |
|---|---|---|
| 2010/0195213 A1 | 8/2010 | Bolis |
| 2017/0315274 A1 | 11/2017 | Park et al. |
| 2019/0158750 A1* | 5/2019 | Kim .......................... G03B 5/00 |

FOREIGN PATENT DOCUMENTS

| | | |
|---|---|---|
| CN | 200962150 | 10/2007 |
| CN | 101988984 | 3/2011 |
| CN | 102654733 | 9/2012 |
| CN | 103826040 | 5/2014 |
| CN | 107241545 | 10/2017 |
| CN | 107544102 | 1/2018 |
| CN | 107710030 | 2/2018 |
| GB | 2 422 441 | 7/2006 |
| JP | 2006-252725 | 9/2006 |
| JP | 2012-103626 | 5/2012 |
| WO | 2009/010562 | 1/2009 |
| WO | 2016/195811 | 12/2016 |

OTHER PUBLICATIONS

Extended European Search Report dated Jan. 5, 2022, in corresponding European Patent Application No. 19897502.1.
International Search Report dated Feb. 1, 2020 in International (PCT) Application No. PCT/CN2019/113349.

* cited by examiner

CAMERA MODULE WITH LIQUID LENS AND IMAGE PLANE CORRECTION METHOD THEREOF

FIELD OF THE INVENTION

The present invention relates to a camera module, in particular to a camera module with liquid lens and an image plane correction method thereof.

BACKGROUND OF THE INVENTION

The lens of the camera module is composed of multiple lenses together to form an optical system. In order to achieve higher imaging quality, the number of lenses is increasing, reaching 6 or even 7 lenses. The number of lenses required for the zoom camera module may be even greater. As a result, the volume of the lens becomes larger and larger, which is not advantageous for the development trend of miniaturization and thinning of the camera module. In addition, the camera module used for shooting macros has higher requirements on the light-gathering ability of the lens. In addition to using a material with a high refractive index, the curvature of the lens is increased to improve the light-gathering ability of the lens. However, due to the limitations of materials and technology, the curvature of the lens must be controlled within a range. Therefore, in a super macro lens, that is, when the focal length of the lens is 40 mm or less, the lens made of existing rigid materials cannot meet the needs of shooting at super macro.

The liquid lens includes a rigid support and two optical film layers, and the two optical film layers respectively cover an upper opening and a lower opening of the rigid support to seal a liquid in a including cavity of the rigid support. The optical film layer can be deformed, and the liquid placed between the two optical film layers has fluidity, so that the liquid lens can be easily made into a super-macro lens with a very small focal length. Further, the focal length of the liquid lens can be changed by driving the two optical film layers close to or away from each other, so that the camera module can image with different focal lengths. However, a single liquid lens will inevitably produce aberrations during actual use, such as field curvature, which further affects the final imaging effect of the camera module. Specifically, when the focal length of the liquid lens is reduced by increasing the curvature of the optical film layer of the liquid lens, so that when the camera module can take macro photos, the focal length of the liquid lens is reduced, a distance between the center of the image plane and the liquid lens will be smaller than a distance between the periphery of the image plane and the liquid lens while imaging, which in turn makes the image plane of a single liquid lens as a curved surface, which reduces the imaging quality of the camera module.

Therefore, there is an urgent need to improve the camera module with liquid lens to improve the aberration phenomenon and improve the imaging quality of the camera module.

SUMMARY OF THE INVENTION

An object of the present invention is to provide a camera module with liquid lens and an image plane correction method thereof, wherein the camera module can improve imaging quality of the liquid lens of the camera module by a correction lens, thereby improving the imaging quality of the camera module.

Another object of the present invention is to provide a camera module with liquid lens and an image plane correction method thereof, wherein the camera module improves the imaging quality of the liquid lens by correcting aberrations such as spherical aberration and astigmatism.

Another object of the present invention is to provide a camera module with liquid lens and an image plane correction method thereof, wherein the correction lens and the liquid lens cooperate with each other to compensate for field curvature of an optical system to improve the imaging quality of the camera module.

Another object of the present invention is to provide a camera module with liquid lens and an image plane correction method thereof, wherein the correction lens of the camera module is held on an optical axis of the liquid lens, and the correction lens can be driven to reciprocate on the optical axis of the liquid lens to correct the field curvature of the optical system, thereby improving the imaging quality of the camera module.

Another object of the present invention is to provide a camera module with liquid lens and an image plane correction method thereof, wherein the correction lens of the camera module provides at least one rigid lens, and by driving the rigid lens to reciprocate on the optical axis of the liquid lens, the correction lens can cooperate with the liquid lens to eliminate or reduce the field curvature.

Another object of the present invention is to provide a camera module with liquid lens and an image plane correction method thereof, wherein the correction lens of the camera module provides at least one compensation liquid lens, and the compensation liquid lens can compensate the aberration of the camera module with the liquid lens.

Another object of the present invention is to provide a camera module with liquid lens and an image plane correction method, wherein focal power of the compensation liquid lens can be matched with focal power of the liquid lens to eliminate or reduce the field curvature.

Another object of the present invention is to provide a camera module with liquid lens and an image plane correction method, wherein a distance between center of an image plane and the lens can be approximately equal to a distance from periphery of the image plane to the lens by changing a shape of the compensation liquid lens, thereby eliminating or reducing the field curvature and improving the imaging quality of the camera module.

Another object of the present invention is to provide a camera module with liquid lens and an image plane correction method thereof, wherein a curvature of the compensation liquid lens is cooperate with a curvature of the liquid lens by directly controlling change of shape of an optical film layer of the compensation liquid lens to eliminate or reduce the field curvature.

Another object of the present invention is to provide a camera module with liquid lens and an image plane correction method thereof, wherein a shape of the optical film layer of the compensation liquid lens is changed by driving the flow of liquid of the compensation liquid lens to make the focal power of the compensation liquid lens match the focal power of the liquid lens, thereby eliminating or reducing the field curvature.

According to one aspect of the present invention, the present invention further provides a camera module with liquid lens, including:

a photosensitive assembly;

a lens assembly, wherein the lens assembly includes a liquid lens with adjustable focal power, and the liquid lens is held in a photosensitive path of the photosensitive assembly; and a correction lens, wherein the correction lens is held in the photosensitive path of the photosensitive assembly, and the correction lens is located between the liquid lens and the photosensitive assembly, and the correction lens and the liquid lens of the lens assembly cooperate with each other to compensate for aberrations.

According to an embodiment of the present invention, the correction lens includes at least one rigid lens and a driving element, wherein at least one of the rigid lenses is drivably connected to the driving element in a manner of capable of reciprocating along an optical axis of the liquid lens.

According to an embodiment of the present invention, the rigid lens has a second light-incident surface and a second light-emitting surface opposite to the second light-incident surface, wherein the second light-incident surface faces the liquid lens, and the second light-emitting surface faces the photosensitive assembly, and a distance between the second light-emitting surface of the rigid lens and the photosensitive assembly can be adjusted.

According to an embodiment of the present invention, the second light-incident surface is a concave surface, and the second light-emitting surface is a convex surface, and a curvature of the second light-incident surface is greater than that of the second light-incident surface.

According to an embodiment of the present invention, the second light-incident surface is a convex surface, and the second light-emitting surface is a concave surface, and the curvature of the second light-emitting surface is greater than that of the second light-incident surface.

According to an embodiment of the present invention, the second light-incident surface of the rigid lens is a flat surface and the second light-emitting surface is a concave surface.

According to an embodiment of the present invention, the second light-incident surface of the rigid lens is a concave surface and the second light-emitting surface is a flat surface.

According to an embodiment of the present invention, the second light-incident surface of the rigid lens is a concave surface and the second light-emitting surface is a concave surface.

According to an embodiment of the present invention, the correction lens includes at least one compensation liquid lens, wherein focal power of the compensation liquid lens and focal power of the liquid lens cooperate with each other to compensate for aberrations.

According to an embodiment of the present invention, the compensation liquid lens includes a second light-incident film layer and a second light-emitting film layer, wherein the second light-incident film layer and the second light-emitting film layer changes the focal power of the liquid compensation lens in a manner of being deformed.

According to an embodiment of the present invention, the compensation liquid lens includes a second liquid, wherein the second liquid is sealed between the second light-incident film layer and the second light-emitting film layers, and the second liquid changes the focal power of the compensation lens in a manner of being driven to flow.

According to an embodiment of the present invention, focal power and refractive index of all the lenses of the camera module meet the following conditions: $\Sigma \varphi i/ni=0$, where $\varphi i$ is focal power of any one of the lens of the camera module, and $ni$ is refractive index of the lens.

According to an embodiment of the present invention, the liquid lens includes a first liquid, wherein refractive index of the first liquid of the liquid lens is greater than that of the second liquid of the compensation liquid lens of the correction lens, thereby reducing other aberrations of the camera module.

According to one aspect of the present invention, the present invention further provides a method of assembling a camera module with liquid lens, including the following steps:

(a) holding a liquid lens with adjustable focal power in a photosensitive path of a photosensitive assembly; and (b) assembling a correction lens between the liquid lens and the photosensitive assembly in an adjustable manner, wherein when the focal power of the liquid lens changes, the aberration produced is compensated by adjusting the correction lens.

According to an embodiment of the present invention, the correction lens is held in the photosensitive path of the photosensitive assembly in such a manner that a rigid lens of the correction lens is close to the photosensitive assembly.

According to an embodiment of the present invention, in the above method, the correction lens can be movably provided on an optical axis of the liquid lens.

According to an embodiment of the present invention, in the step (a), the liquid lens is provided on the photosensitive path of the photosensitive assembly in a manner to maintain an upper surface of the liquid lens as a convex surface.

According to an embodiment of the present invention, in the step (b), a compensation liquid lens with adjustable focal power is provided between the liquid lens and the photosensitive assembly.

According to another aspect of the present invention, the present invention further provides an image plane correction method of an optical system, including the following steps:

(I) obtaining an image by a camera module with liquid lens;

(II) calculating a compensation amount required for the camera module with the liquid lens according to the aberration of the image; and (III) adjusting a correction lens of the camera module with liquid camera lens according to the compensation amount to compensate for the aberration of the image.

According to another aspect of the present invention, in the step (III), further including step (IV): compensate a field curvature change caused by a curvature changes of a first light-incident film layer and a first light-emitting film layer of the liquid lens.

According to another aspect of the present invention, in the step (IV), a rigid lens of the correction lens is driven to move on the optical axis of the liquid lens.

According to another aspect of the present invention, in the step (IV), the focal power of the correction lens is changed to match the focal power of the liquid lens.

According to another aspect of the present invention, the above method further includes step (V): the focal power of the compensation liquid lens is changed by driving a second light-incident film layer and a second light-emitting film layer of a compensation liquid lens of the correction lens to change curvatures.

According to another aspect of the present invention, in the step (V), the second light-incident film layer and the second light-emitting film layer of the compensation liquid lens are directly driven to be deformed.

According to another aspect of the present invention, in the step (V), the curvatures of the second light-incident film layer and the second light-emitting film layer are indirectly changed in a manner of driving a second liquid of the compensation liquid lens to flow.

According to another method of the present invention, the present invention further provides an image plane correction method of a camera module, including the following steps: when focal power of a liquid lens of a camera module changes, aberration caused by a change of the focal power of the liquid lens is compensated by adjusting a correction lens, wherein the correction lens is held in a photosensitive path of a photosensitive assembly, and the correction lens is located between the photosensitive assembly and the liquid lens with variable focal power.

According to a preferred embodiment of the present invention, in the above method, the aberration caused by the change of the focal power of the liquid lens is compensated by changing a distance between a rigid lens of the correction lens and the liquid lens.

According to a preferred embodiment of the present invention, in the above method, the aberration caused by the change of the focal power of the liquid lens is compensated by changing the focal power of the correction lens.

DETAIL DESCRIPTION OF THE INVENTION

Figure 1:
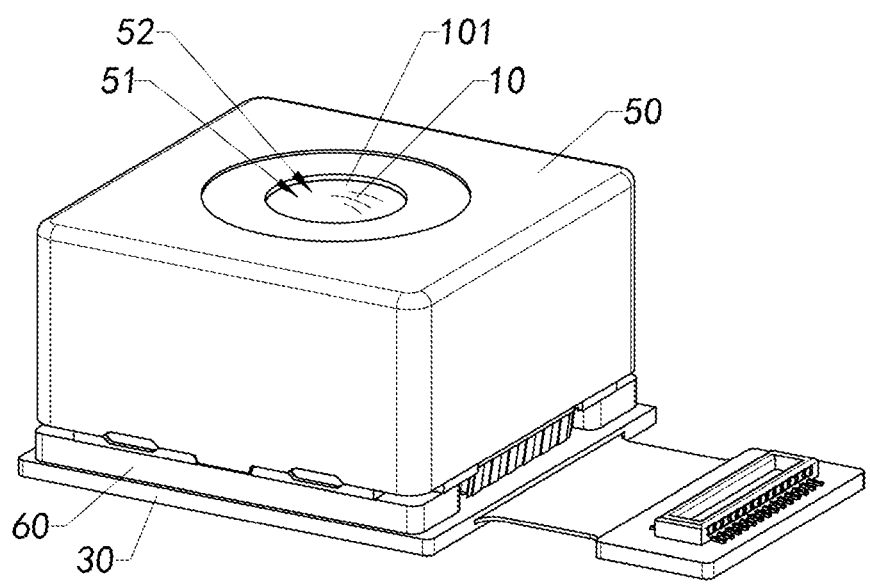
FIG. 1 is a schematic perspective view of a camera module with liquid lens according to a preferred embodiment of the present invention.

The following description is used to disclose the present invention so that those skilled in the art can implement the present invention. The preferred embodiments in the following description are only illustration, and those skilled in the art can think of other obvious variations. The basic principles of the present invention defined in the following description can be applied to other embodiments, modifications, improvements, equivalents, and other technical solutions that do not deviate from the spirit and scope of the present invention.

Those skilled in the art should understand that, in the disclosure of the present invention, the orientation or positional relationship indicated by the terms "longitudinal", "lateral", "upper", "lower", "front", "rear", "left", "right", "vertical", "horizontal", "top", "bottom", "inner", "outer", etc. are based on the orientation or positional relationship shown in the drawings, which is only for the convenience of describing the present invention and simplifying the description, rather than indicating or implying that the device or element referred to must have a specific orientation, be constructed and operated in a specific orientation, and therefore the above-mentioned terms should not be construed as a limitation of the present invention.

It can be understood that the term "a" should be understood as "at least one" or "one or more", that is, in one embodiment, the number of an element may be one, and in another embodiment, the number of the element can be more than one, and the term "one" cannot be understood as a restriction on the number.

Referring to FIGS. 1 to 3C of the specification, a camera module with liquid lens according to a preferred embodiment of the present invention will be described in the following description, wherein the camera module includes a lens assembly 10, a correction lens 20 and a photosensitive assembly 30, and the lens assembly 10 further includes a liquid lens 11, the liquid lens 11 and the correction lens 20 are held in a photosensitive path of the photosensitive assembly 30, and the correction lens 20 is held on an optical axis of the liquid lens 11, the correction lens 20 is located between the liquid lens 11 and the photosensitive assembly 30, and focal power of the correction lens 20 and the liquid lens 11 are mutually compatible, so that a position of an image plane formed is always kept unchanged, and aberrations such as field curvature, spherical aberration, and astigmatism of the camera module can be corrected to achieve a better imaging effect, thereby improving imaging quality of the camera module.

Referring to FIGS. 1 to 3C, the liquid lens 11 includes a first supporting body 111, a first light-incident film layer 112, a first light-emitting film layer 113, and a first liquid 114, wherein the first supporting body 111 has a first accommodating cavity 1111 for accommodating the first liquid 114, and the first light-incident film layer 112 and the first light-emitting film layer 113 are respectively provided on two sides of the first supporting body 111 to seal the first liquid 114 in the first accommodating cavity 1111. Further, the liquid lens 11 has a first light-incident surface 101 and a first light-emitting surface 102 opposite to the first light-incident surface 101, wherein the first light-incident surface 101 and the first light-emitting surface 102 are respectively formed on the first light-incident film layer 112 and the first light-emitting film layer 113, and the first light-emitting surface 102 faces the correction lens 20, and external light enters the liquid lens 11 through the first light-incident surface 101.

The lens assembly 10 further includes at least one auxiliary lens 12, wherein the auxiliary lens 12 is held between the liquid lens 11 and the correction lens 20, and external light sequentially passes through the liquid lens 11 and the auxiliary lens 12 and the correction lens 20, and form an image on a photosensitive surface 31 of the photosensitive assembly 30, and the auxiliary lens 12 can reduce aberration caused by the imaging of the single liquid lens 11. In other words, the liquid lens 11, the auxiliary lens 12, and the correction lens 20 of the lens assembly 10 can cooperate with each other to correct aberration of an optical system of the camera module, thereby achieving better imaging effect.

It is worth mentioning that a focal length of the liquid lens 11 can be adjusted, and the focal length of the camera module can be less than 50 mm, that is, the camera module is a micro-focus lens, so that the camera module can shoot at a macro distance and is advantageous for miniaturization and ultra-thinness of the camera module.

Further, the first light-incident film layer 112 and the first light-emitting film layer 113 are made of elastic material, and the first supporting body 111 is made of rigid material. The first light-incident film layer 112 and the first light-emitting film layer 113 provided on the rigid first supporting body 111 can be deformed, thereby causing the focal power of the liquid lens 11 to change. It should be understood that materials of the first light-incident film layer 112, the first light-emitting film layer 113, and the first supporting body 111 are not limited, and the first light-incident film layer 112 and the first light-emitting film layer 113 can be made of, but not limited to, silicon rubber, hard plastic elastomer, thermoplastic elastomer, acrylic elastomer or polyurethane elastomer, or other materials known to those skilled in the art; the first supporting body 111 can be made of, but not limited to, glass, plastic, metal or other materials known to those skilled in the art.

Moreover, the specific implementation of the liquid lens 11 is not limited. Preferably, the first light-incident film layer 112 and the first light-emitting film layer 113 may be adhered to the first supporting body 111 by an adhesive. Alternatively, the first light-incident film layer 112 and the first light-emitting film layer 113 may be welded to seal a first accommodating cavity 1111 of the first supporting body 111. Alternatively, the first light-incident film layer 112 and the first light-emitting film layer 113 can be clamped to the first supporting body 111, and seal the first accommodation cavity 1111 of the first supporting body 111. In other words, the first light-incident film layer 112 and the first light-emitting film layer 113 can be directly or indirectly fixed to the first supporting body 111 to seal the first liquid 114 in the first accommodating cavity 1111 of the first supporting body 111. Those skilled in the art should know that the specific implementation of the liquid lens 11 is only an example, and cannot be a limitation on the content and scope of the camera module with liquid lens of the present invention.

Surface shapes of the first light-incident film layer 112 and the first light-emitting film layer 113 of the liquid lens 11 can be driven to change, thereby changing curvatures of the first light-incident film layer 112 and the first light-emitting film layer 113, to change the focal power of the liquid lens 11. That is, by controlling a manner of changing the focal power of the liquid lens 11, a zooming capability of the camera module can be improved, so that the camera module can shoot macro shots. Specifically, the liquid lens 11 is electrically connected to a control circuit, and shapes of the first light-incident film layer 112 and the first light-emitting film layer 113 of the liquid lens 11 can be changed through an actuator, so that the curvatures of the first light-incident surface 101 and the first light-emitting surface 102 are changed, thereby changing the focal power of the liquid lens 11 to adjust the focal length of the camera module. More specifically, when the curvatures of the first light-incident film layer 112 and the first light-emitting film layer 113 of the liquid lens 11 become larger, the focal length of the camera module becomes shorter; and when the curvatures of the first light-incident film layer 112 and the first light-emitting film layer 113 of the liquid lens 11 becomes smaller, the focal length of the camera module becomes longer. It should be understood that the type of the actuator is not limited, and the actuator can be implemented as, but not limited to, an electrostatic actuator, an electromagnetic actuator, an electromagnetic actuator, an electroactive polymer actuator, a piezoelectric actuator, a fluid pump actuator or other actuators known to those skilled in the art.

According to a preferred embodiment of the present invention, the liquid lens 11 maintains a convex upper surface in the state of not being energized. In this way, after the camera module is assembled, it is no need to be energized, and the liquid lens 11 can also form images normally. Preferably, the liquid lens 11 maintains a form of a biconvex lens in the state of not being energized, that is, both the first light-incident surface 101 and the first light-emitting surface 102 of the liquid lens 11 are convex surfaces, referring to FIG. 3A. Preferably, the liquid lens 11 maintains a form of a plano-convex lens in the state of not being energized, that is, the first light-incident surface 101 of the liquid lens 11 is a convex surface, and the first light-emitting surface 102 is a flat surface, referring to to FIG. 4A; or, the first light-incident surface 101 of the liquid lens 11 is a flat surface, and the first light-emitting surface 102 is a convex surface. Preferably, the liquid lens 11 maintains a form of a concave-convex lens in the state of not being energized, that is, the first light-incident surface 101 of the liquid lens 11 is a convex surface, and the first light-emitting surface 102 is a concave surface, and a curvature of the first light-incident surface 101 is greater than a curvature of the first light-emitting surface 102, referring to FIG. 4B. In other embodiments of the present invention, the liquid lens 11 can also be implemented to maintain a form of a concave lens in the state of not being energized, and after being energized, a shape of a convex lens is formed by driving the first light-incident film layer 112 and the first light-emitting film layer 113 to deform, so that images can be formed normally. In other words, the liquid lens 11 is a convex lens under normal working conditions and has a positive focal power.

Further, a phenomenon of field curvature of the liquid lens 11 during an imaging process can be reduced by the calibration lens 20, so as to improve the imaging quality of the camera module. In a preferred embodiment of the present invention, the correction lens 20 includes at least one rigid lens 21, the rigid lens 21 is held on the optical axis of the liquid lens 11, and the rigid lens 21 can be driven to reciprocate on the optical axis of the liquid lens 11 to ensure that when the focal length of the liquid lens 11 changes, a position of an image plane of the camera module always remains unchanged, while aberrations such as field curvature of the optical system of the camera module are compensated, so as to enable the camera module to achieve higher imaging quality. It is worth mentioning that specific material of the rigid lens 21 is not limited. The rigid lens 21 can be made of, but not limited to, glass, plastic, resin or other materials known to those skilled in the art.

Specifically, in the rigid lens 21 of the correction lens 20, the rigid lens 21 close to the photosensitive assembly 30 is a concave lens, and the rigid lens 21 has negative focal power, and the rigid lens 21 that has negative focal power can cooperate with the liquid lens 11 with positive focal power to reduce the field curvature and improve the imaging quality of the camera module. The rigid lens 21 further has a second light-incident surface 201 and a second light-emitting surface 202 opposite to the second light-incident surface 201, wherein the second light-incident surface 201 faces the liquid lens 11, and the second light-emitting surface 202 faces the photosensitive assembly 30.

Figure 3A:
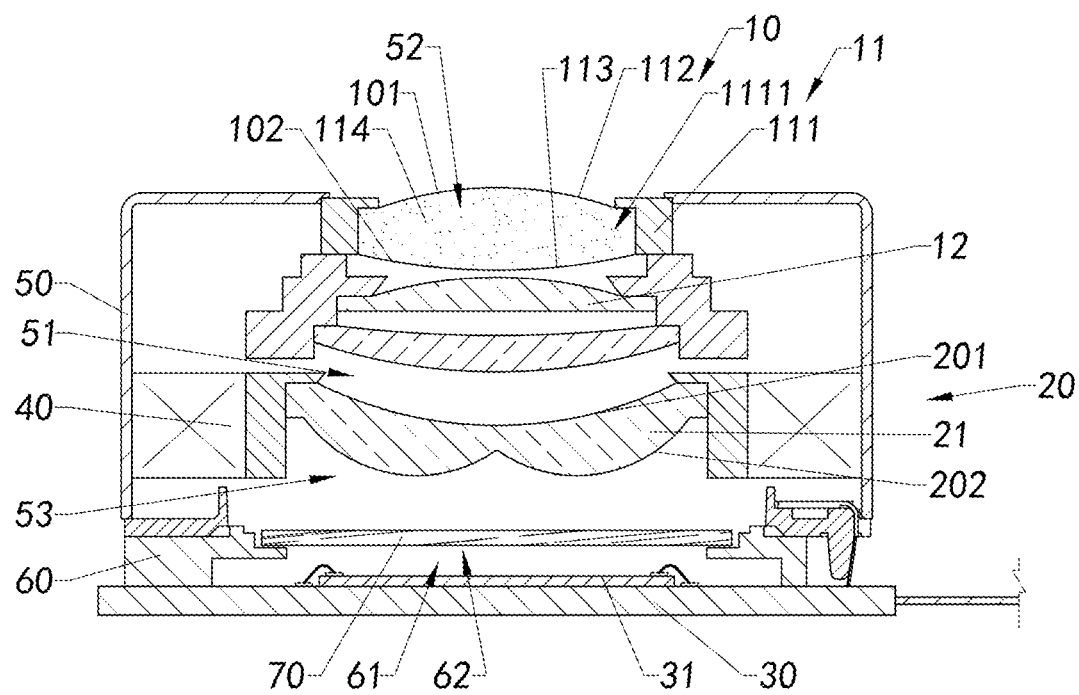
FIG. 3A is a schematic cross-sectional view of the camera module with liquid lens according to the above-mentioned preferred embodiment of the present invention.
Figure 4A:
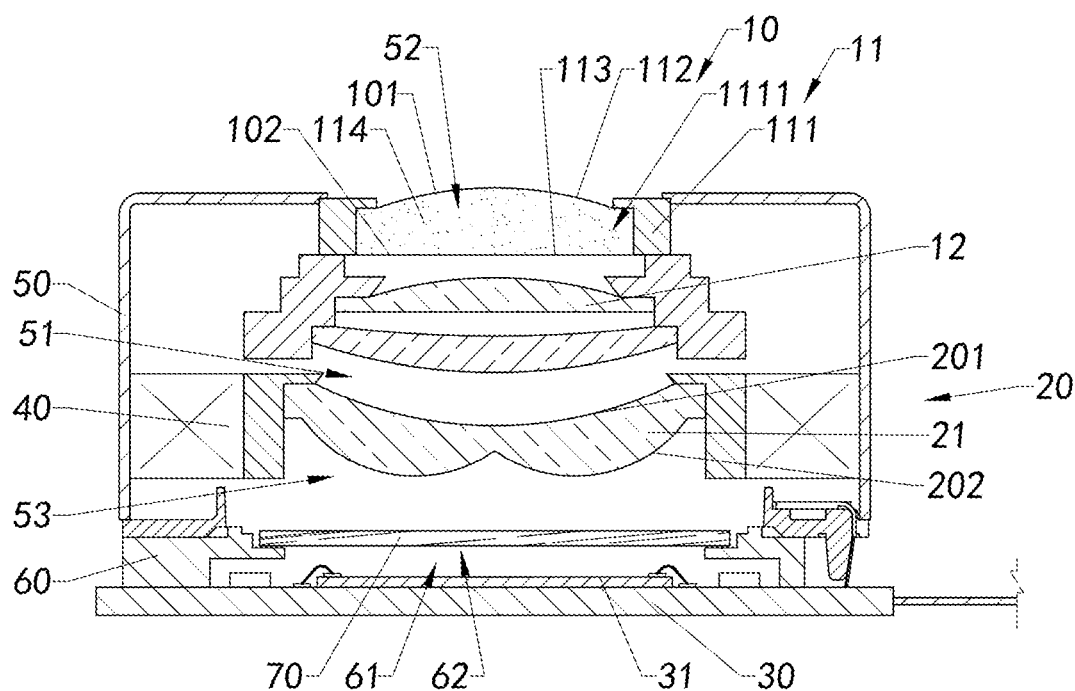
FIG. 4A is a schematic cross-sectional view of the camera module with liquid lens according to another preferred embodiment of the present invention.
Figure 4B:
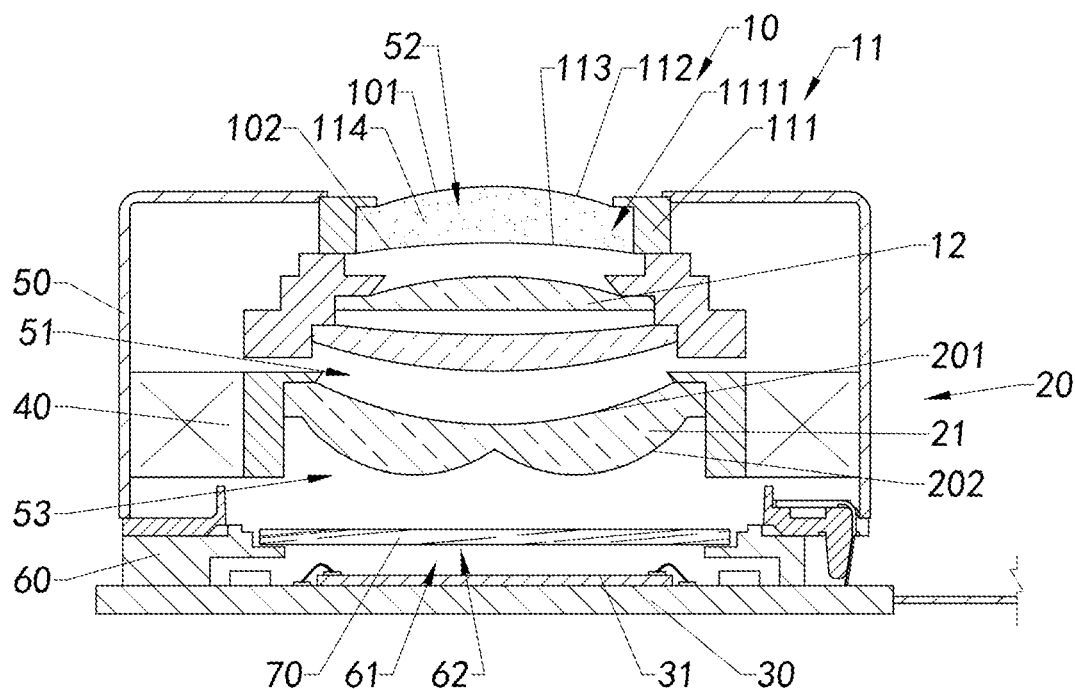
FIG. 4B is a schematic cross-sectional view of the camera module with liquid lens according to another preferred embodiment of the present invention.
Figure 5A:
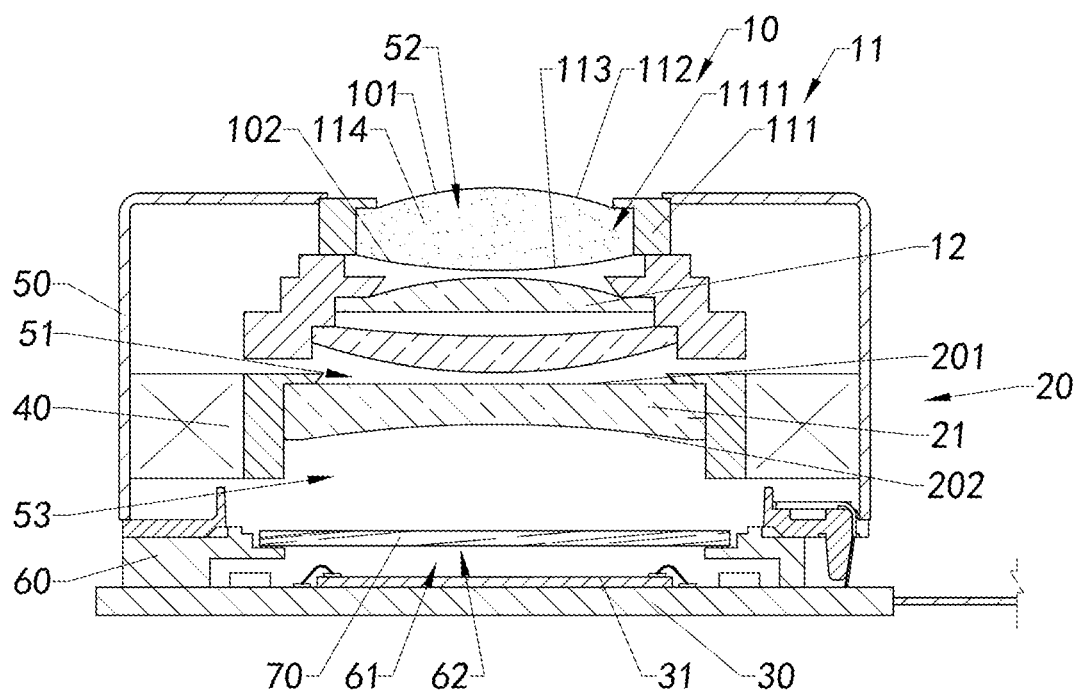
FIG. 5A is a schematic cross-sectional view of the camera module with liquid lens according to another preferred embodiment of the present invention.
Figure 5B:
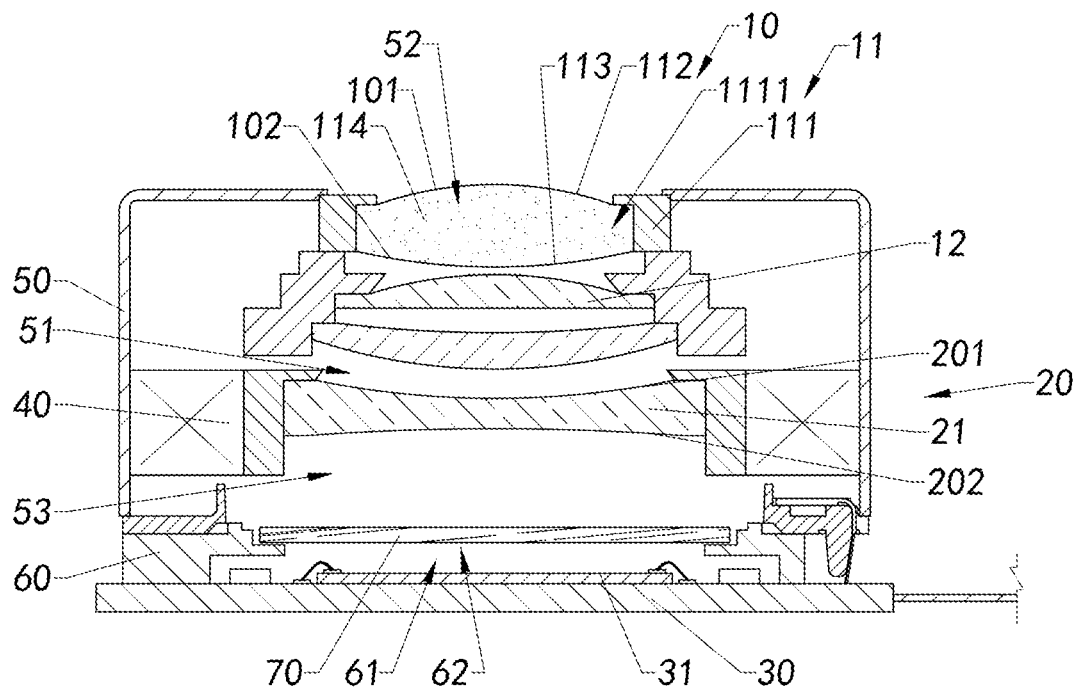
FIG. 5B is a schematic cross-sectional view of the camera module with liquid lens according to another preferred embodiment of the present invention.

Preferably, the rigid lens 21 is a convex-concave lens, that is, the second light-incident surface 201 of the rigid lens 21 is a concave surface, the second light-emitting surface 202 is a convex surface, and a curvature of the second light-incident surface of 201 is greater than that of the second light-emitting surface 202, referring to FIG. 3A; or, the second light-incident surface 201 is a convex surface, and the second light-emitting surface 202 is a concave surface, and the curvature of the second light-emitting surface 202 is greater than that of the second light-emitting surface 201. Preferably, the rigid lens 21 is a plano-concave lens, that is, the second light-incident surface 201 of the rigid lens 21 is a flat surface, and the second light-emitting surface 202 is a concave surface, referring to FIG. 5A; or, the second light-incident surface 201 of the rigid lens 21 is a concave surface, and the second light-emitting surface 202 is a flat surface. Preferably, the rigid lens 21 is a biconcave lens, that is, both of the second light-incident surface 201 and the second light-emitting surface 202 of the rigid lens 21 are concave surfaces, referring to FIG. 5B.

Further, during a zooming or focusing process of the camera module, the curvatures of the first light-incident film layer 112 and the first light-emitting film layer 113 of the liquid lens 11 change. By driving the rigid lens 21 of the correction lens 20 to reciprocate on the optical axis of the liquid lens 11, it can compensate the field curvature to ensure that the position of the image plane of the camera module remains unchanged at all times, while aberrations such as the field curvature of the optical system of the camera module are compensated, thereby improving the imaging quality of the camera module.

Figure 3B:
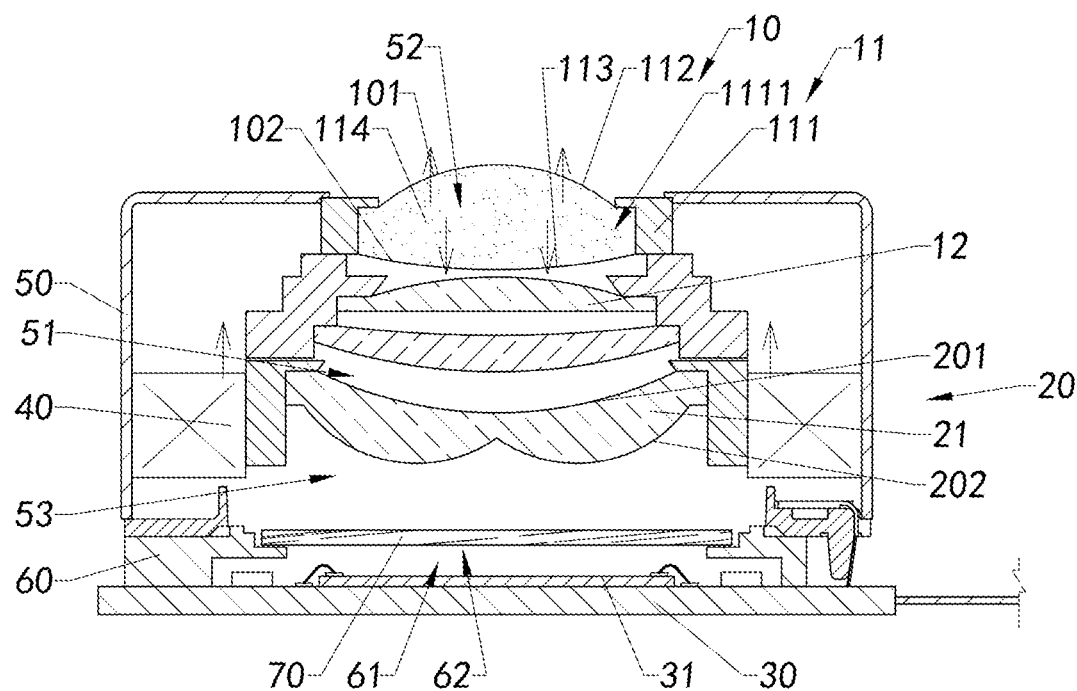
FIG. 3B is a schematic diagram of an example of an application scenario of the camera module with liquid lens according to the above-mentioned preferred embodiment of the present invention.
Figure 3C:
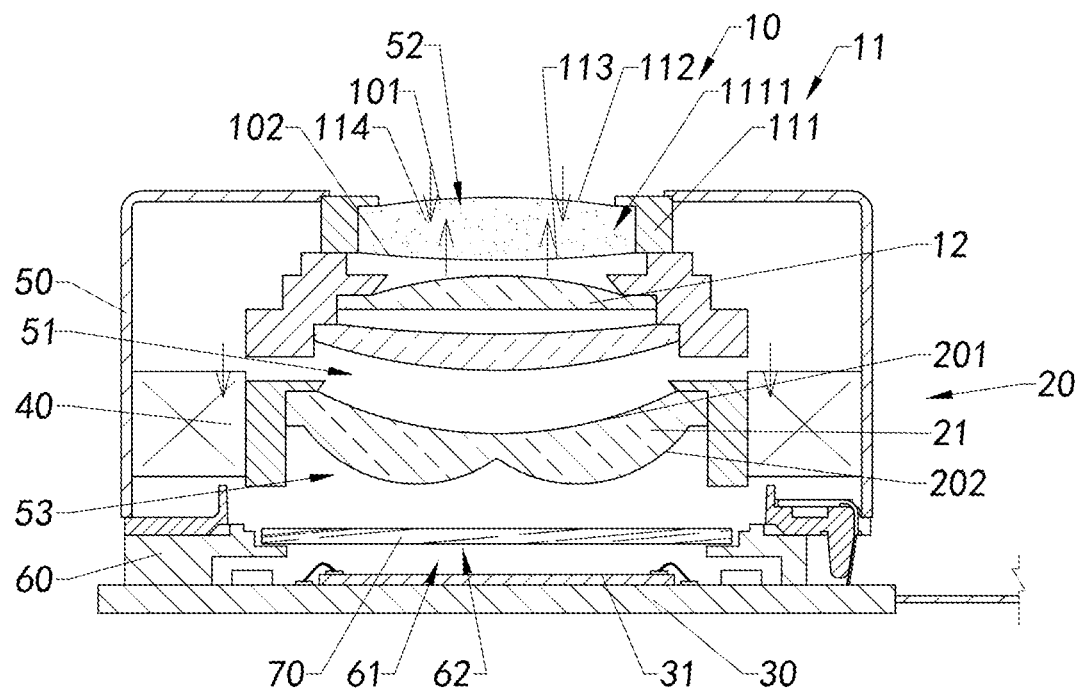
FIG. 3C is a schematic diagram of an example of an application scenario of the camera module with liquid lens according to the above-mentioned preferred embodiment of the present invention.

For example, referring to FIG. 3B, when the camera module is used to shoot super macro, that is, the object surface is less than 5 cm from the lens, by controlling the actuator to make the curvatures of the first light-incident film layer 112 and the first light-emitting film layer 113 of the liquid lens 11 increase, the focal length of the camera module becomes shorter, and at the same time, the rigid lens 21 close to the photosensitive assembly 30 in the rigid lens 21 of the correction lens 20 is driven to move in a direction of the optical axis of the liquid lens 11 toward the photosensitive assembly 30, thereby compensating for changes of the field curvature caused by change of the curvatures of the first light-incident film layer 112 and the first light-emitting film layer 113 of the liquid lens 11. Refer to FIG. 3C, by controlling the actuator, the curvatures of the first light-incident film layer 112 and the first light-emitting film layer 113 of the liquid lens 11 can be reduced, so that the focal length of the liquid lens 11 becomes longer, and at the same time, the rigid lens 21 close to the photosensitive assembly 30 in the rigid lens 21 of the correction lens 20 is driven to move in a direction of the optical axis of the liquid lens 11 toward the liquid lens 11, thereby compensating for the changes of the field curvature caused by the change of the curvatures of the first light-incident film layer 112 and the first light-emitting film layer 113 of the liquid lens 11. In this way, by correcting aberrations such as field curvature of the optical system of the camera module, the imaging quality of the camera module is further improved. It is worth mentioning that the specific moving direction of the rigid lens 21 of the correction lens 20 and the implementation of the focal length change of the liquid lens 11 are merely examples. Those skilled in the art should know that due to different optical designs such as different shapes of the lens, the movement direction of the rigid lens 21 of the correction lens 20 will also be different, and the curvature shown in the drawings of the specification is only an example, and cannot be used for limiting the content and scope of the camera module with liquid lens of the present invention.

Figure 2:
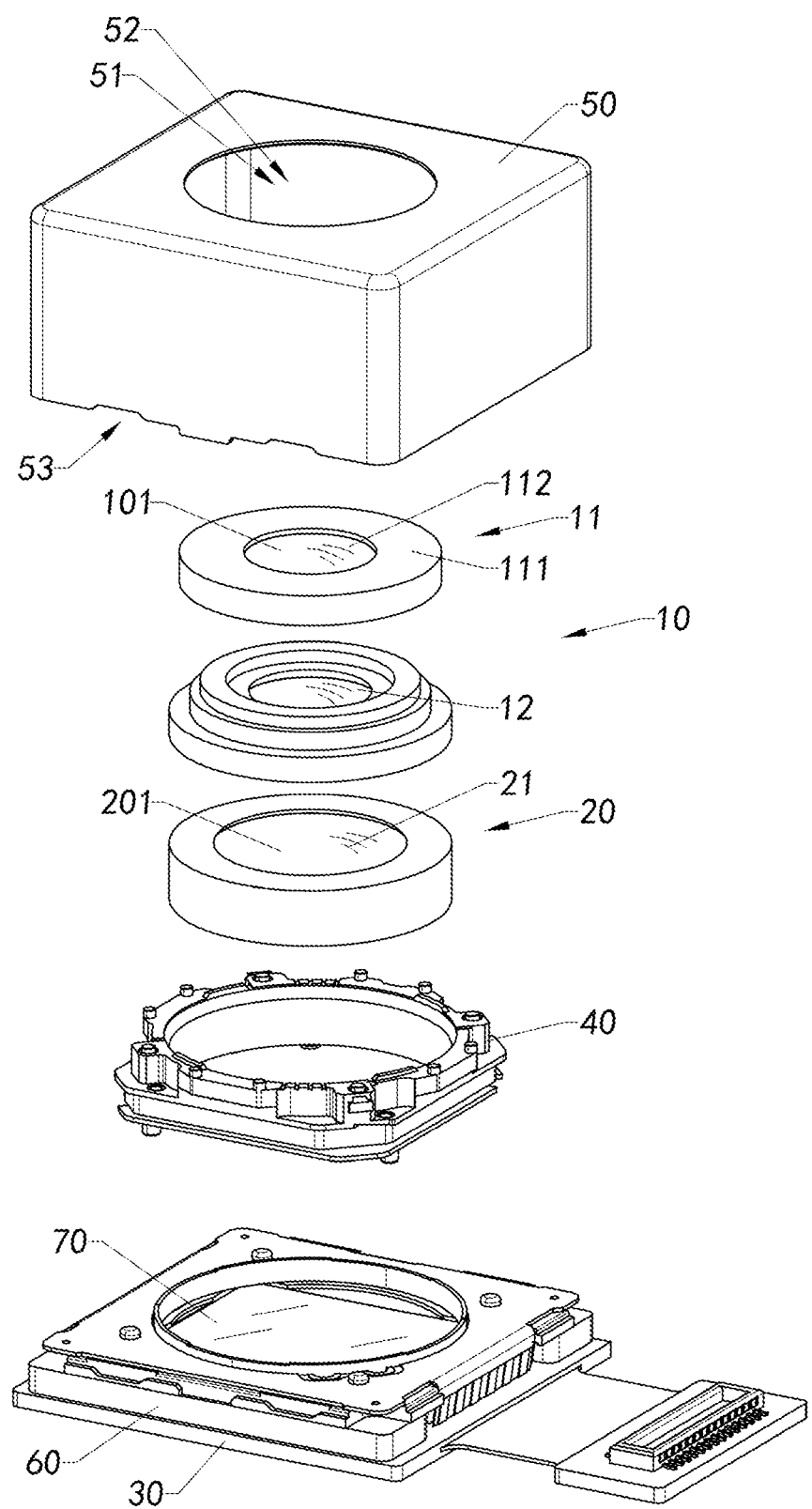
FIG. 2 is a schematic diagram of an exploded view of the camera module with liquid lens according to the above-mentioned preferred embodiment of the present invention.

Referring to FIG. 2, the camera module further includes a driving element 40, the driving element 40 is connected to the rigid lens 21 close to the photosensitive assembly 30 of the rigid lens 21 of the correction lens 20, so the driving element 40 can drive the rigid lens 21 of the correction lens 20 to move on the optical axis of the liquid lens 11, so that the correction lens 20 can compensate for the changes of the field curvature caused by the changes of the curvatures of the light-incident film layer 112 and the first light-emitting film layer 113 of the liquid lens 11, so as to compensate for the aberration of the optical system of the camera module. Preferably, the drive element 40 is implemented as a motor.

Figure 5C:
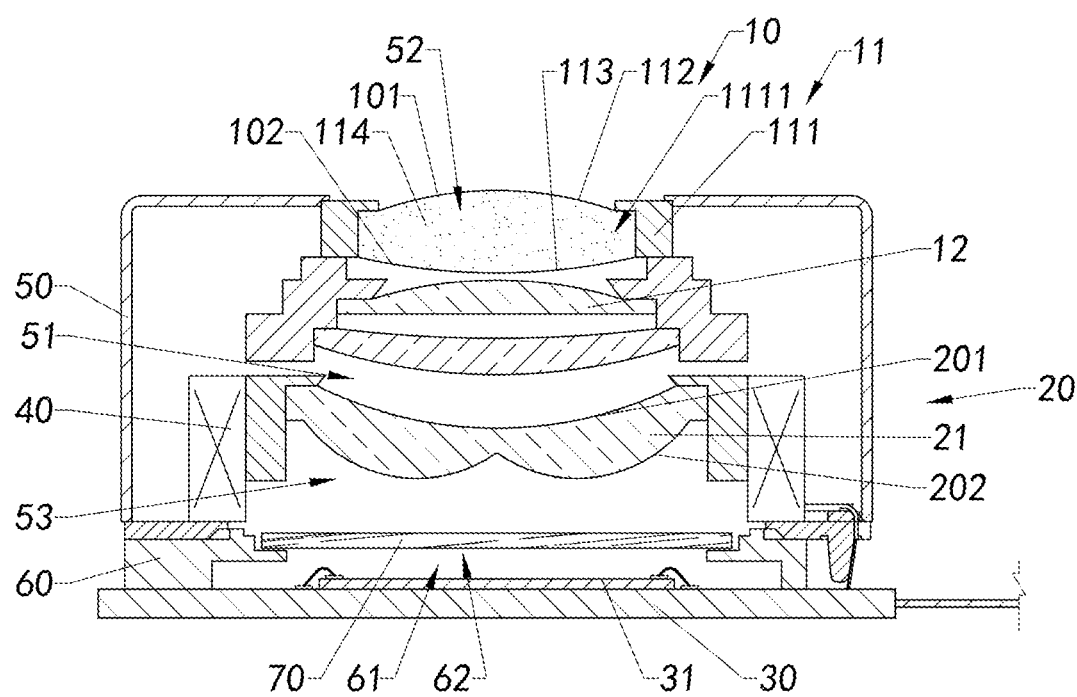
FIG. 5C is a schematic cross-sectional view of the camera module with liquid lens according to another preferred embodiment of the present invention.

Referring to FIG. 2, the camera module further includes a housing 50 and a lens holder 60, wherein the housing 50 has an accommodating space 51, a light entrance 52 and a light exit 53 communicating with the accommodating space 51, and the lens holder 60 has an imaging space 61 and an optical path opening 62 communicating with the imaging space 61. The housing 50 is provided on the lens holder 60, and the optical path opening 63 communicates with the accommodating space 51 and the imaging space 61. The liquid lens 11, the correcting lens 20, and the driving element 40 are accommodated in the accommodating space 51, and the photosensitive assembly 30 is provided in the imaging space 61 in a way that a photosensitive surface 31 of the photosensitive assembly 30 faces the liquid lens 10. Preferably, referring to FIGS. 3A to 5B, the driving element 40 is fixed to the housing 50. Preferably, referring to FIG. 5C, the driving element 40 is fixed to the lens holder 60.

Referring to FIG. 2, the camera module further includes a color filter element 70, wherein the color filter element 70 is provided between the correction lens 20 and the photosensitive assembly 30, and the color filter element 70 is held on the photosensitive path of the photosensitive assembly 30, the color filter element 70 is capable of filtering stray light and undesired infrared light to ensure the imaging effect of the camera module.

Figure 6:
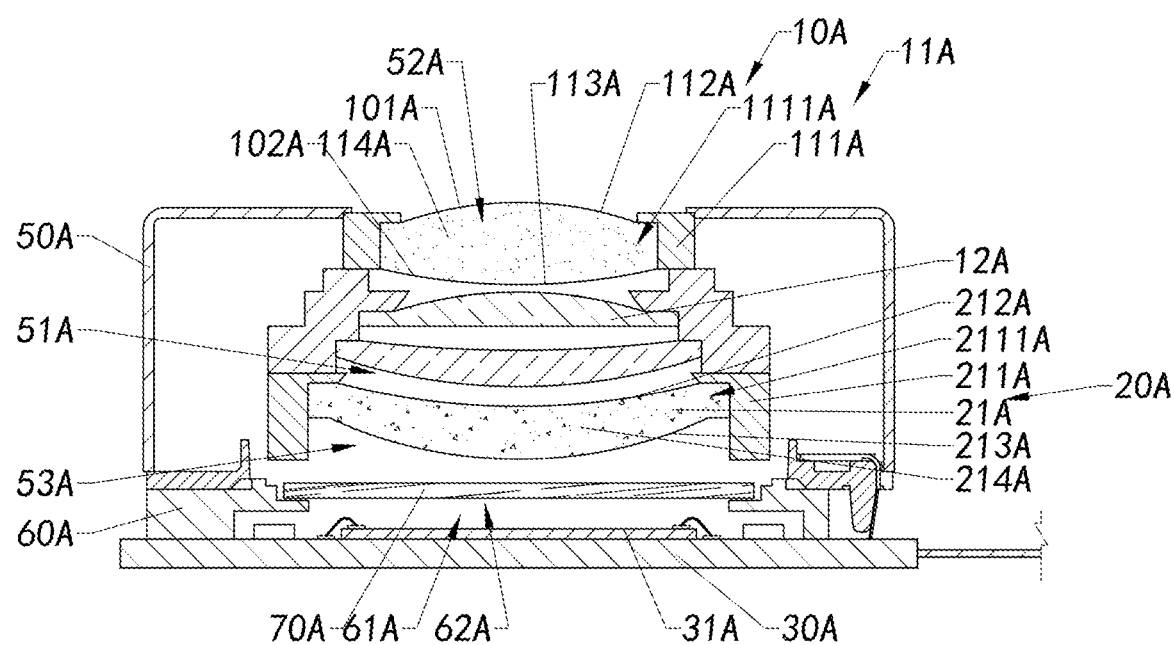
FIG. 6 is a schematic cross-sectional view of the camera module with liquid lens according to another preferred embodiment of the present invention.
Figure 7A:
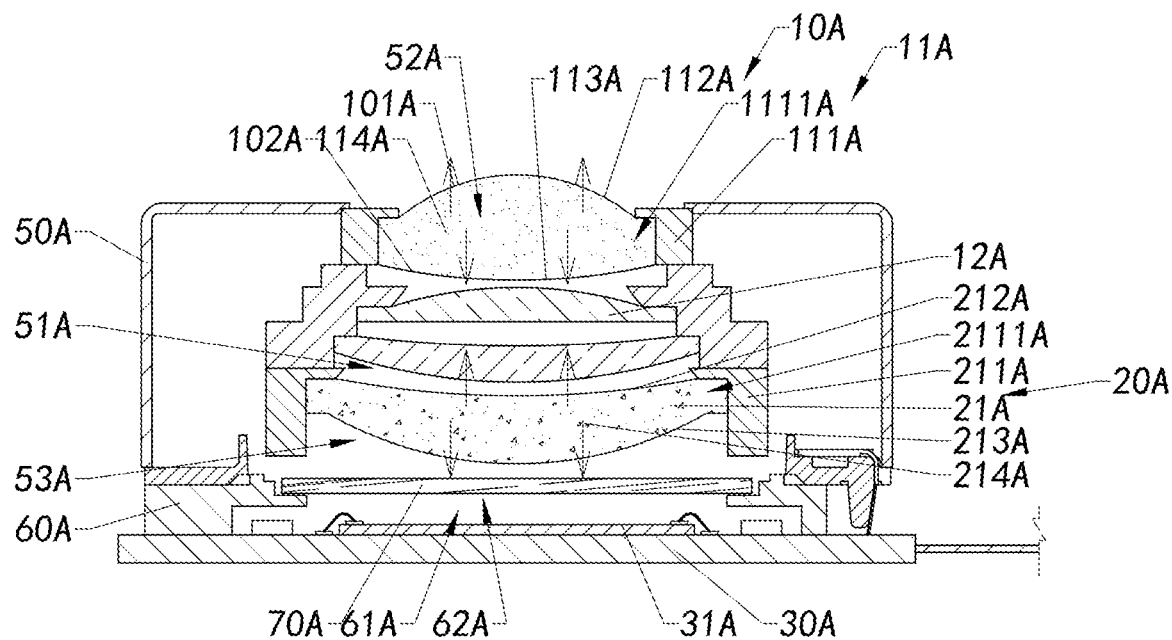
FIG. 7A is a schematic diagram of an example of an application scenario of the camera module with liquid lens according to the above-mentioned preferred embodiment of the present invention.
Figure 7B:
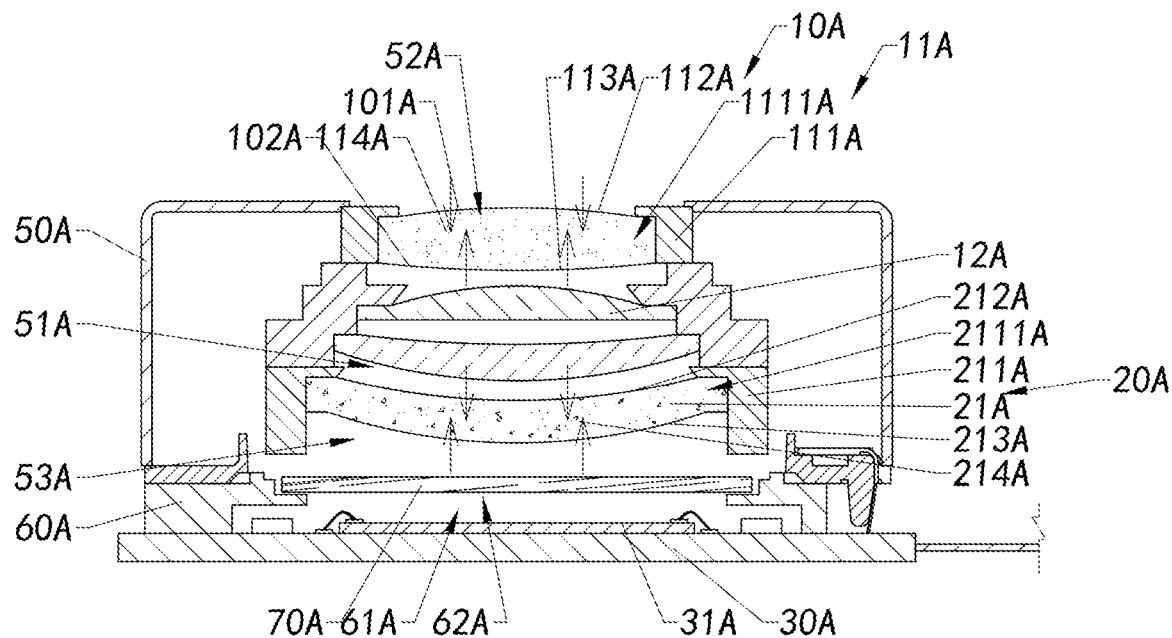
FIG. 7B is a schematic diagram of application scene distance of the camera module with liquid lens according to the above-mentioned preferred embodiment of the present invention.

Referring to FIGS. 6 to 7B, the camera module with liquid lens according to another preferred embodiment of the present invention will be explained in the following description. The difference between the camera module with liquid lens shown in FIGS. 6 to 7B and the camera module with liquid lens shown in FIGS. 1 to 3C is that in the camera module with liquid lens shown in FIGS. 6 to 7B, a correction lens 20A includes at least one compensation liquid lens 21A, wherein focal power of the compensation liquid lens 21A can cooperate with focal power of a liquid lens 11A, thereby reducing the field curvature and improving the imaging quality of the camera module.

Specifically, the compensation liquid lens 21A includes a second supporting body 211A, a second light-incident film layer 212A, a second light-emitting film layer 213A, and a second liquid 214A, wherein the second supporting body 211A has a second accommodating cavity 2111A for accommodating the second liquid 214A, the second light-incident film layer 212A and the second light-emitting film layer 213A are respectively provided on both sides of the second supporting body 211A, so as to seal the second liquid 214A in the second accommodating cavity 2111A. Further, the compensation liquid lens 21A has a second light-incident surface 201A and a second light-emitting surface 202A opposite to the second light-incident surface 201A, wherein the second light-incident surface 201A and the second light-emitting surface 202A is respectively formed on the second light-incident film layer 212A and the second light-emitting film layer 213A, and the second light-incident surface 201A faces the first light-emitting surface 102A of the liquid lens 11A, and the second light-emitting surface 202A faces the photosensitive assembly 30A, and light emitted from the first light-emitting surface 102A of the liquid lens 11A can sequentially pass through an auxiliary lens 12A and the second light-incident surface 201A and the second light-emitting surface 202A of the compensation liquid lens 21A of the correction lens 20A, and image on a photosensitive surface 31A of the photosensitive assembly 30A.

Further, the second light-incident film layer 212A and the second light-emitting film layer 213A are made of an elastic material, and the second supporting body 211A is made of a rigid material. The second light-incident film layer 212A and the second light-emitting film layer 213A provided on the rigid second supporting body 211A can be deformed to cooperate with the change of the focal length of the liquid lens 11A to compensate for the aberrations such as field curvature of the optical system of the camera module. It should be understood that the materials of the second light-incident film layer 212A, the second light-emitting film layer 213A, and the second supporting body 211A are not limited, and the second light-incident film layer 212A and the second light-emitting film layer 213A can be made of, but not limited to, silicon rubber, hard plastic elastomer, thermoplastic elastomer, acrylic elastomer or polyurethane elastomer or other materials known to those skilled in the art; the second supporting body 211A can be made of, but not limited to, glass, plastic, metal or other materials known to those skilled in the art.

Moreover, the specific implementation of the liquid lens 11A is not limited. Preferably, the second light-incident film layer 212A and the second light-emitting film layer 213A can be adhered to the second supporting body 211A through an adhesive. Alternatively, the second light-incident film layer 212A and the first light-emitting film layer 113 may be welded to seal the second accommodating cavity 2111A of the second supporting body 211A. Alternatively, the second light-incident film layer 212A and the second light-emitting film layer 213A can be clamped to the second supporting body 211A, and seal the second accommodating cavity 2111A of the second supporting body 211A. That is, the second light-incident film layer 212A and the second light-emitting film layer 213A can be directly or indirectly fixed to the second supporting body 211A to seal the second liquid 214A in the second accommodating cavity 2111A of the second supporting body 211A. Those skilled in the art should know that the specific implementation of the liquid lens 11A is merely an example, and cannot be a limitation on the content and scope of the camera module with liquid lens of the present invention.

Further, the second light-incident film layer 212A and the second light-emitting film layer 213A of the compensation liquid lens 21A of the correction lens 20A can be driven to change, thereby changing curvatures of the second light-incident film layer 212A and the second light-emitting film layer 213A, and enabling the focal power of the compensation liquid lens 21A and the focal power of the liquid lens 11A to cooperate with each other, so as to reduce the field curvature of the optical system of the camera module. Specifically, the compensation liquid lens 21A is electrically connected to the control circuit, and shapes of the second light-incident film layer 212A and the second light-emitting layer of the compensation liquid lens 21A can be changed through the actuator, so that the curvatures of the second light-incident surface 201A and the second light-emitting surface 202A are changed, and in turn the focal power is changed, thereby cooperating with changes of the curvatures of a first light-incident film layer 112A and a first light-emitting film layer 113A of the liquid lens 11A, and aberration of imaging of the liquid lens 11A are compensated, thereby reducing the aberration and improving the imaging quality of the camera module.

For example, referring to FIG. 7A, by controlling the actuator to make the curvatures of the first light-incident film layer 112A and the first light-emitting film layer 113A of the liquid lens 11A increase, the focal length of the liquid lens 11A becomes shorter, accordingly, by controlling the actuator, the curvatures of the second light-incident film layer 212A and the second light-emitting film layer 213A of the compensation liquid lens 21A are increased, so as to cooperate with the changes of the curvatures of a first light-incident surface 101A and a first light-emitting surface 102A of the liquid lens 11A, thereby reducing aberrations such as field curvature of the camera module. Referring to FIG. 7B, by controlling the actuator, the curvatures of the first light-incident film layer 112A and the first light-emitting film layer 113A of the liquid lens 11A are reduced, so that the focal length of the camera module become longer, accordingly, by controlling the actuator, the curvatures of the second light-incident film layer 212A and the second light-emitting film layer 213A of the compensation liquid lens 21A are reduced, so as to cooperate with the changes of the curvatures of the first light-incident surface 101A and the first light-emitting surface 102A of the liquid lens 11A, thereby reducing aberrations such as field curvature of the camera module. In this way, it is possible to correct aberrations such as field curvature caused by the changes of the curvatures of the first light-incident film layer 112A and the first light-emitting film layer 113A of the liquid lens 11A, thereby improving the imaging quality of the camera module. It is worth mentioning that implementations of the specific curvature changes of the second light-incident film layer 212A and the second light-emitting film layer 213A of the compensation liquid lens 21A of the correction lens 20A and the focal length change of the liquid lens 11A is only as an example. Those skilled in the art should know that in other embodiments, due to different optical designs such as different shapes of lens, the changes of the curvatures of the second light-incident film layer 212A and the second light-emitting film layer 213A would also be different, and the degree and ratio of the changes of the liquid lens 11A and the compensation liquid lens 21A shown in the accompanying drawings of the specification are only examples, and they cannot be a limitation on the content and scope of the camera module with liquid lens of the present invention.

In a preferred embodiment of the present invention, the second light-incident film layer 212A and the second light-emitting film layer 213A of the compensation liquid lens 21A are directly driven to deform by the actuator. In other embodiments of the present invention, movement of the second liquid 214A accommodated between the first light-incident film layer 212A and the second light-emitting film layer 213A can be controlled by the actuator, to indirectly change the curvatures of the second light-incident film layer 212A and the second light-emitting film layer 213A of the compensation liquid lens 21A.

Preferably, focal power and refractive index of all lenses of the camera module satisfy: $\Sigma\varphi i/ni=0$, where $\varphi i$ is the focal power of any one of the lens of the camera module, and ni is the refractive index of the lens, that is, the sum of the ratios of the focal power of all lenses of the camera module to their refractive index is equal to zero. Moreover, when the above formula is satisfied, refractive index of a first liquid 114A of the liquid lens 11A is greater than that of the second liquid 214A of the compensation liquid lens 21A of the correction lens 20A. More preferably, when the above formula is satisfied, the refractive index of the first liquid 114A of the liquid lens 11A and the second liquid 214A of the compensation liquid lens 21A should be selected as large as possible to avoid other aberrations. Specifically, when a distance between an object surface and the liquid lens 11A is less than 5 cm, the liquid lens 11A has advantages in process and cost compared with conventional lenses. When working in this range, the focal power of the liquid compensation lens 21A and the liquid lens 11A cooperate with each other to eliminate or reduce the field curvature.

It should be understood that the shape of the compensation liquid lens 21A in the state of not being energized is not limited. Preferably, the compensation liquid lens 21A maintains the form of a biconcave lens in the state of not being energized, that is, the second light-incident surface 201A and the second light-emitting surface 202A of the compensation liquid lens 21A are both concave surfaces, and the compensation liquid lens 21A has a crescent shape. Preferably, the compensation liquid lens 21A maintains the form of a plano-concave lens in the state of not being energized, that is, the second light-incident surface 201A of the compensation liquid lens 21A is a concave surface, and the second light-emitting surface 202A is a flat surface; or, the second light-incident surface 201A of the compensation liquid lens 21A is a flat surface, and the second light-emitting surface 202A is a concave surface. Preferably, the compensation liquid lens 21A maintains the form of a convex-concave lens in the state of not being energized, that is, the second light-incident surface 201A of the compensation liquid lens 21A is a concave surface, and the second light-emitting surface 202A is convex surface, and the curvature of the second light-incident surface 201A is greater than that of the second light-emitting surface 202A; or, the second light-incident surface 201A of the compensation liquid lens 21A is a convex surface, and the second light-emitting surface 202A is a concave surface, and the curvature of the second light-emitting surface 202A is greater than that of the second light-incident surface 201A. In other embodiments of the present invention, the compensation liquid lens 21A can also be implemented to maintain the form of a convex lens in the state of not being energized, and after being energized, by driving the second light-incident film layer 212A and the second light-emitting film layer 213A to deform, the shape of a concave lens is formed, and the image can be formed normally. In other words, the compensation liquid lens 21A is a concave lens under normal working conditions, and the focal power of the compensation liquid lens 21A can be cooperated with the focal power of the liquid lens 11A, so as to ensure that the image plane position of the camera module remains unchanged at all times, and to compensate for aberrations such as field curvature of the optical system of the camera module, thereby improving the imaging quality of the camera module.

According to another aspect of the present invention, the present invention further provides an assembling method of a camera module with liquid lens, wherein the assembling method includes the following steps:

(a) maintain a liquid lens 11A with an adjustable focal power of a camera module in a photosensitive path of a photosensitive assembly 30;

(b) assembling a correction lens 20 between the liquid lens and the photosensitive assembly in an adjustable manner, wherein when the focal power of the liquid lens 11A changes, the correction lens 20 is adjusted to compensate the resulting aberrations.

Specifically, in the step (a), the liquid lens 11 is provided in the photosensitive path of the photosensitive assembly 30 in a manner to maintain the liquid lens 11 in the form of a convex lens. In this way, after the camera module is assembled, there is no need to energize, the liquid lens 11 can also image normally, and the assembly process can be adjusted through its imaging to achieve higher assembly accuracy. It should be understood that the type of the liquid lens 11 is not limited, and the liquid lens 11 may be implemented as a meniscus lens, a plano-convex lens, or a biconvex lens.

Preferably, in the step (b), a rigid lens 21 of the correcting lens 20 is kept close to a photosensitive surface 31 of the photosensitive assembly 30 to maintain the corrective lens 20 on the photosensitive path of the photosensitive assembly 30. Further, the correction lens 20 can be movably provided on the optical axis of the liquid lens 11, so that a distance between the correction lens 20 and the photosensitive assembly 30 can be adjusted. Further, the rigid lens 21 of the correction lens 20 is a concave lens, that is, the rigid lens 21 has negative focal power, and the rigid lens 21 with negative focal power can cooperate with the liquid lens 11 with positive focal power to eliminate field curvature and improve the imaging quality of the camera module. It should be understood that the type of the rigid lens 21 is not limited, and the rigid lens 21 may be implemented as a convex-concave lens, a plano-concave lens, or a double-concave lens.

In another preferred embodiment of the present invention, a compensation liquid lens 21A of the correction lens 20A is provided in the photosensitive path of the photosensitive assembly 30. Preferably, the focal power and refractive index of all lenses of the camera module satisfy: $\Sigma\varphi i/ni=0$, where $\varphi i$ is the focal power of any lens of the camera module, and ni is the refraction of the lens, that is, the sum of the ratios of the focal power of all lenses of the camera module to their refractive indices is equal to zero. Moreover, when the above formula is satisfied, the refractive index of the first liquid 114A of the liquid lens 11A is greater than the refractive index of the second liquid 214A of the compensation liquid lens 21A of the correction lens 20A. More preferably, when the above formula is satisfied, the refractive index of the first liquid 114A of the liquid lens 11A and the second liquid 214A of the compensation liquid lens 21A should be selected as large as possible to avoid other Aberration. Further, the form of the compensation liquid lens 21A in the state of not being energized is not limited. The compensation liquid lens 21A can be kept in the form of a concave lens or a convex lens when it is not energized, but the compensation liquid lens 21A is a concave lens under normal working conditions, and the focal power of the compensation liquid lens 21A can be matched with the focal power of the liquid lens 11A to ensure that the image plane position of the camera module remains unchanged at all times and to compensate for the field curvature and other aberrations of the optical system of the camera module, thereby improving the imaging quality of the camera module.

Further, before the step (b), it includes the step of maintaining an auxiliary lens 12 between the liquid lens 11 and the photosensitive assembly 30. The external light passes through the liquid lens 11, the auxiliary lens 12 and the correction lens 20 in sequence, and then reaches the photosensitive surface 31 of the photosensitive assembly 30.

According to another aspect of the present invention, the present invention further provides an image plane correction method of an optical system, including the following steps:

(I) obtaining an imaging by a camera module with liquid lens;

(II) calculating a compensation amount required by the camera module with liquid lens according to an aberration of the imaging; and (III) adjusting a correction lens of the camera module with liquid lens according to the compensation amount to compensate for the aberration of the imaging.

Specifically, light from an object to be photographed enters the camera module with liquid lens, and the light passes through a liquid lens 11, an auxiliary lens 12, and a correction lens 20 of a lens assembly 10 in sequence, and forms an image on a photosensitive surface 301 of a photosensitive assembly 30, and then the camera module with liquid lens obtains the imaging. By adjusting focal power of the liquid lens 11, focal length of the camera module with liquid lens can be adjusted, and macro is able to be shot. When the focal power of the liquid lens 11 changes, aberrations such as field curvature appear in the image obtained by the camera module with liquid lens. A processing device calculates a compensation amount required by the camera module with liquid lens according to the image aberration, so as to subsequently adjust the correction lens of the camera module with liquid lens according to the compensation amount, and to make the correction lens and the liquid lens 11 cooperate with each other to reduce or eliminate aberrations. Specifically, the processing device is communicably connected to the photosensitive assembly 30 and the correction lens 20. The photosensitive assembly 30 converts optical signals into electrical signals and transmits the electrical signals to the processing device. The processing device calculates the compensation amount required by the camera module with liquid lens according to the image aberration. The processing device may be implemented as a processor of a mobile electronic device using the camera module with liquid lens, or the processing device may also be implemented as the processor of the camera module with liquid lens. Those skilled in the art should understand that the specific implementation of the processing device is only an example, and cannot be a limitation on the content and scope of the image plane correction method of the optical system of the present invention.

Further, in the step (III), it further includes a step (IV): compensating change of field curvature caused by changes of curvatures of a first light-incident film layer 112 and a first light-emitting film layer 113 of the liquid lens 11.

Preferably, a rigid lens 21 of the correction lens 20 is driven to reciprocate on an optical axis of the liquid lens 11, so that the correction lens 20 and the liquid lens 11 cooperate with each other, thereby compensating aberrations such as field curvature of the optical system of the camera module.

Preferably, focal power of the correction lens 20A is changed to cooperate with the focal power of the liquid lens 11A, thereby reducing the field curvature of the optical system of the camera module. Specifically, in the above method, the method further includes a step (V): by driving a second light-incident film layer 212A and a second light-emitting film layer 213A of a compensation liquid lens 21A of the correction lens 20A to deform, negative focal power of the compensation liquid lens 21A is changed, so that changes of curvatures of the second light-incident film layer 212A and the second light-emitting film layer 213A of the compensation liquid lens 21A can be cooperate with that of a first light-incident surface 101A and a first light-emitting surface 102A of the liquid lens 11A, so that it is possible to compensate change of field curvature caused by changes of the curvatures of the first light-incident film layer 112 and the first light-emitting film layer 113 of the liquid lens 11 by changing the negative field curvature of the compensation liquid lens 21A, thereby reducing field curvature, thereby improving the imaging quality of the camera module.

Preferably, in the above method, the second light-incident film layer 212A and the second light-emitting film layer 213A of the compensation liquid lens 21A are directly driven to deform. Preferably, in the above method, the curvatures of the second light-incident film layer 212A and the second light-emitting film layer 213A are indirectly changed by driving a second liquid 214A of the compensation liquid lens 21A to flow. It should be understood that the manner of changing the curvatures of the second light-incident film layer 212A and the second light-emitting film layer 213A of the compensation liquid lens 21A is only for illustration, and cannot be a limitation on the content and scope of the image plane correction method of the camera module with liquid lens of the present invention.

According to another aspect of the present invention, the present invention further provides an image plane correction method of a camera module, wherein the image plane correction method includes the following steps: when focal power of a liquid lens 11 of a camera module changes, aberration caused by change of the focal power of the liquid lens 11 is compensated by adjusting a correction lens 20, wherein the correction lens 20 is held in a photosensitive path of a photosensitive assembly 30, and the correction lens 20 is located between the photosensitive assembly 30 and the liquid lens 11 with variable focal power. Preferably, the aberration caused by the change of the focal power of the liquid lens is compensated by changing a distance between a rigid lens 21 of the correction lens 20 and the liquid lens 11. The aberration caused by the change of the focal power of the liquid lens 11 is compensated by changing the focal power of the correction lens. Preferably, the aberration caused by the change of the focal power of the liquid lens 11 is compensated by changing the focal power of the correction lens 20.

Those skilled in the art can understand that the above embodiments are only illustration, in which the features of different embodiments can be combined with each other to obtain embodiments that are easily conceivable according to the disclosure of the present invention but are not clearly indicated in the drawings.

Those skilled in the art should understand that the above description and the embodiments of the present invention shown in the drawings are only illustration and do not limit the present invention.

The purpose of the present invention has been completely and effectively achieved. The functions and structural principles of the present invention have been shown and explained in the embodiments. Without departing from the principles, the embodiments of the present invention may have any variation or modification.

The invention claimed is:

1. A camera module with liquid lens, which is characterized by comprising:
a photosensitive assembly;
a lens assembly, wherein the lens assembly includes a liquid lens with adjustable focal power, and the liquid lens is held in a photosensitive path of the photosensitive assembly; and
a correction lens, wherein the correction lens is held in the photosensitive path of the photosensitive assembly, and the correction lens is located between the liquid lens and the photosensitive assembly, and the correction lens and the liquid lens of the lens assembly cooperate with each other to compensate for aberrations;
wherein the correction lens includes at least one compensation liquid lens, and focal power of the compensation liquid lens and focal power of the liquid lens cooperate with each other to compensate for aberrations.

2. The camera module with liquid lens according to claim 1, wherein the correction lens includes at least one rigid lens and a driving element, and at least one of the rigid lenses is drivably connected to the driving element in a manner of capable of reciprocating along an optical axis of the liquid lens.

3. The camera module with liquid lens according to claim 2, wherein the rigid lens has a second light-incident surface and a second light-emitting surface opposite to the second light-incident surface, and the second light-incident surface faces the liquid lens, and the second light-emitting surface faces the photosensitive assembly, and a distance between the second light-emitting surface of the rigid lens and the photosensitive assembly can be adjusted.

4. The camera module with liquid lens according to claim 3, wherein the second light-incident surface is a concave surface, and the second light-emitting surface is a convex surface, and a curvature of the second light-incident surface is greater than a curvature of the second light-incident surface.

5. The camera module with liquid lens according to claim 3, wherein the second light-incident surface is a convex surface, and the second light-emitting surface is a concave surface, and a curvature of the second light-emitting surface is greater than a curvature of the second light-incident surface.

6. The camera module with liquid lens according to claim 3, wherein the second light-incident surface of the rigid lens is a flat surface and the second light-emitting surface is a concave surface; or the second light-incident surface of the rigid lens is a concave surface and the second light-emitting surface is a flat surface; or the second light-incident surface of the rigid lens is a concave surface and the second light-emitting surface is a concave surface.

7. The camera module with liquid lens according to claim 1, wherein the compensation liquid lens includes a second light-incident film layer and a second light-emitting film layer, and the second light-incident film layer and the second light-emitting film layer changes the focal power of the liquid compensation lens in a manner of being deformed.

8. The camera module with liquid lens according to claim 7, wherein the compensation liquid lens includes a second liquid, and the second liquid is sealed between the second light-incident film layer and the second light-emitting film layers, the second liquid changes the focal power of the compensation lens in a manner of being driven to flow.

9. The camera module with liquid lens according to claim 8, wherein focal power and refractive index of all the lenses of the camera module meet the following conditions: $\Sigma \varphi i / ni = 0$, where $\varphi i$ is focal power of any one of the lens of the camera module, where $ni$ is refractive index of the lens.

10. The camera module with liquid lens according to claim 9, wherein the liquid lens includes a first liquid, and refractive index of the first liquid of the liquid lens is greater than refractive index of the second liquid of the compensation liquid lens of the correction lens.

* * * * *